G. F. HULLINGS.
DRYING AND STRETCHING FRAME FOR LACE CURTAINS.
APPLICATION FILED JAN. 30, 1907.
12,896. Reissued Dec. 15, 1908.
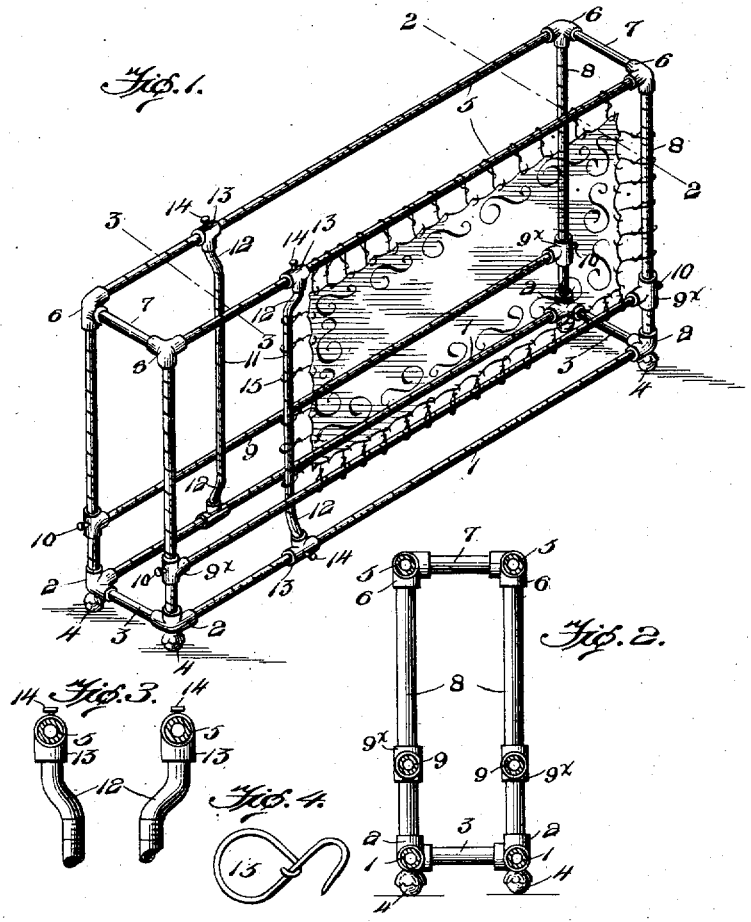
Witnesses.
B. M. Offutt,
E. McSpring.
Inventor.
George F. Hullings,
by David T. Moore.
Atty.
THE NORRIS PETERS CO., WASHINGTON, D. C.

UNITED STATES PATENT OFFICE.

GEORGE F. HULLINGS, OF WASHINGTON, DISTRICT OF COLUMBIA.

DRYING AND STRETCHING FRAME FOR LACE CURTAINS.

No. 12,896. Specification of Reissued Letters Patent. Reissued Dec. 15, 1908.

Original No. 757,930, dated April 19, 1904, Serial No. 175,354. Application for reissue filed January 30, 1907. Serial No. 354,948.

*To all whom it may concern:*

Be it known that I, GEORGE F. HULLINGS, a citizen of the United States, residing at Washington, in the District of Columbia, have invented new and useful Improvements in Drying and Stretching Frames for Lace Curtains, of which the following is a specification.

My invention relates to drying-frames for lace curtains; and one of the objects of the same is to provide a frame with means for accurate adjustment to accommodate curtains of different sizes.

Another object is to provide means whereby the curtain will be equally stretched both longitudinally and transversely, and still another object is to provide a frame which may be readily taken apart for packing and shipping and which can be readily put together by an unskilled person.

One of the defects of drying frames as heretofore constructed is that no provision is made for indicating the places, at which the pins or hooks should be located in order that the curtain when dry should be uniformly stretched both longitudinally and transversely. Also the use of T-couplings for connecting the sliding bars to the frame, allows the bars to be moved uniformly and simultaneously at both ends, the graduations on the frame being used also for the purpose of quickly alining the couplings.

One of the defects of drying-frames as heretofore constructed is that no provision is made for indicating the places at which the pins or hooks should be located in order that the curtain when dry should be uniformly stretched both longitudinally and transversely. My frame is provided with graduations or indicating-marks which insure a perfect adjustment of the sliding bars and also indicate the points at which the pins or hooks should be placed in order that the curtain shall be equally stretched.

In the accompanying drawings, Figure 1 is a perspective view of a drying-frame made in accordance with my invention and showing a curtain on the frame in position for drying. Fig. 2 is a vertical section on the line 2 2, Fig. 1. Fig. 3 is a detail section taken on the line 3 3, Fig. 1. Fig. 4 is a side view of the hook or pin which I prefer to use.

Like numerals of reference designate like parts wherever they occur in the different views of the drawings.

As shown in the drawings, my drying-frame is made of metal tubing of the required size, and the couplings which I use for assembling the parts may be of the usual or ordinary kinds.

My frame comprises the longitudinal tubes or bars 1 1 at the base, said bars or tubes being provided with graduations or indicating-marks, as shown, and being coupled at the corners of the frame by the couplings 2 2. The end bars 3 3 at the base are also connected to the couplings 2 2. The frame is preferably mounted upon rollers or casters 4 4 in order that it may be easily moved about. The upper longitudinal bars 5 5 are also graduated, as shown, and are connected at the corners by couplings 6 6 and spaced apart by the end bars 7 7. The upper and lower parts of the frame are connected at the corners by the upright corner posts or bars 8 8, and these bars or posts are also provided with suitable graduation-marks, as shown.

The longitudinal adjusting-bars 9 9 are connected at their ends to T-couplings $9^{\times}$ $9^{\times}$, which are fitted to slide freely upon the corner-posts 8 8, and the couplings may be rigidly secured at any points of adjustment by the set-screws 10 10, as will be understood. These longitudinal adjusting-bars 9 9 are provided with indicating-marks for a purpose which will be hereinafter referred to.

The vertical adjusting-bars 11 11 are offset, as at 12 12, in order that independent adjustment of the longitudinal bars 9 and the vertical bars 11 may be accomplished. The ends of the vertical adjusting-bars 11 are fitted into couplings 13, which are mounted to slide upon the bars 1 and 5 and may be secured in adjusted position by the thumb-screws 14.

The hooks or pins 15, Fig. 4, may be made of wire of the required gage and are formed to slide freely upon the graduated bars, as will be readily understood.

When curtains are to be dried upon the frame, the longitudinal bars 9 and the vertical bars 11 are adjusted to conform to the size of the curtain, the graduations upon the bars, 1, 5, and 8 serving to give a perfectly accurate rectangular frame in order that the curtain will be stretched equally and will dry in rectangular form. Curtains will not hang properly if dried so that there is a greater strain exerted diagonally of the curtain, and by means of the graduations on the frame-bars I can secure an exact adjustment, and the curtains when dried will be uniformly rectangular. In order that the strain may be equally exerted at all points around the edge of the curtain, the pins or hooks 15 are adjusted by means of the graduations on the bars to be equal distances apart, and thus insure uniform stretching and drying.

It will be understood that but one set of bars 1, 5, 8, 9, and 11 may be used, if desired, by detaching the end bars 3 and 7; but if it is desired to stretch curtains of different sizes both sections may be used, as the adjustments of both sections are independent. This arrangement is of considerable importance where curtains of different sizes are to be stretched and dried at the same time and upon the same frame.

Having thus fully described my invention, what I claim, and desire to secure by Letters Patent, is:—

1. A stretching and drying frame for lace curtains, comprising a stationary frame, longitudinally-adjustable bars, independently-adjustable transverse bars, said adjustable bars each having a graduated scale thereon, and means for securing the bars in adjusted position.

2. A drying-frame for lace curtains, comprising the stationary frame-bars having graduation-marks thereon, the sliding longitudinal bars and the independently-sliding transverse bars, said sliding bars having graduations to locate the pins or hooks to equalize the strain on the curtain.

3. A drying-frame for lace curtains, comprising the stationary frame, adjustable longitudinal bars, independently-adjustable offset transverse bars and means for securing said sliding bars in adjusted position.

4. A drying-frame for lace curtains, comprising the stationary frame having graduated longitudinal bars and corner-posts, longitudinal bars mounted to slide upon the corner-posts and provided with graduation-marks for the pins or hooks, transverse offset bars mounted to slide upon the longitudinal bars on said frame and provided with graduation-marks, for the pins or hooks, and means for securing the sliding bars independently to the stationary frames.

In testimony whereof I have signed my name to this specification in the presence of two subscribing witnesses.

GEORGE F. HULLINGS.

In the presence of—
F. H. WALKER,
D. P. MOORE.